United States Patent
Ishiba

(10) Patent No.: US 7,568,655 B2
(45) Date of Patent: Aug. 4, 2009

(54) VERTICAL TAKEOFF AND LANDING AIRCRAFT

(75) Inventor: Masatsugu Ishiba, Gotenba (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 353 days.

(21) Appl. No.: 11/504,717

(22) Filed: Aug. 16, 2006

(65) Prior Publication Data

US 2009/0177340 A1    Jul. 9, 2009

(30) Foreign Application Priority Data

Aug. 23, 2005    (JP) .............................. 2005-241479

(51) Int. Cl.
*B64C 27/20* (2006.01)
*G05D 1/08* (2006.01)

(52) U.S. Cl. ...................... 244/23 A; 244/175; 244/181

(58) Field of Classification Search ............... 244/23 A, 244/23 D, 23 C, 12.5, 12.4, 190, 175
See application file for complete search history.

(56) References Cited

U.S. PATENT DOCUMENTS

| 6,126,111 | A | * | 10/2000 | Burcham et al. | .......... 244/76 R |
| 6,227,482 | B1 | * | 5/2001 | Yamamoto | ............... 244/17.13 |
| 7,076,342 | B2 | * | 7/2006 | Fukuda et al. | .................. 701/4 |
| 2005/0096800 | A1 | * | 5/2005 | Tanielian | ........................ 701/2 |

FOREIGN PATENT DOCUMENTS

| JP | 03-070700 | 3/1991 |
| JP | 07-25389 | 1/1995 |
| JP | 2620428 | 3/1997 |
| JP | 3206473 | 7/2001 |
| JP | 2003-252298 | 9/2003 |
| JP | 2004-268640 | 9/2004 |
| JP | 2005-53279 | 3/2005 |
| JP | 2005-125976 | 5/2005 |
| JP | 2005-145264 | 6/2005 |

OTHER PUBLICATIONS

Castillo et al.: Real-Time Stabilization and Tracking of a Four-Rotor Mini Rotorcraft. IEEE Transactions on Control Systems Technology, vol. 12, No. 4, Jul. 2004, pp. 510-516.*
Abdelhamid Tayebi and Stephen McGilvray. Attitude Stabilization of a VTOL Quadrotor Aircraft. IEEE Transactions on Control Systems Technology, vol. 14, No. 3, May 2006. pp. 562-571.*
Japanese Office Action.
Japanese Office Action dated Sep. 10, 2007.
Japanese Office Action dated Feb. 19, 2008.

* cited by examiner

*Primary Examiner*—Michael R Mansen
*Assistant Examiner*—Michael Kreiner
(74) *Attorney, Agent, or Firm*—Finnegan, Henderson, Farabow, Garrett & Dunner, LLP

(57) ABSTRACT

A vertical takeoff and landing aircraft according to the invention includes multiple thrust producing devices that produce thrusts applied in the substantially vertically upward direction; a target attitude setting portion that sets a target attitude used in attitude control of the aircraft; an inertia moment deriving portion that derives an inertia moment applied around a predetermined rotational axis of the aircraft; and a thrust adjustment portion that adjusts, during the attitude control of the aircraft, the thrusts to be produced by the respective thrust producing devices based on the target attitude set by the target attitude setting portion and the inertia moment during the attitude control, which is derived by the inertia moment deriving portion.

6 Claims, 11 Drawing Sheets

VERTICAL TAKEOFF AND LANDING AIRCRAFT

INCORPORATION BY REFERENCE

The disclosure of Japanese Patent Application No. 2005-241479 filed on Aug. 23, 2005 including the specification, drawings and abstract is incorporated herein by reference in its entirety.

BACKGROUND OF THE INVENTION

1. Field of the Invention

The invention relates to a vertical takeoff and landing aircraft that can vertically take off and land.

2. Description of the Related Art

For example, Japanese Patent Application Publication No. JP-A-2005-125976 describes a vertical takeoff and landing aircraft that can vertically take off and land. In the described vertical takeoff and landing aircraft, fans are provided to the front portion and the rear portion of the aircraft. An operator's seat is provided at the middle portion of the aircraft. The operator's seat is arranged such that the seating face thereof is positioned below the rotation planes of the fans. Thus, the attitude of the aircraft during flight is such that the gravity center of the aircraft is suspended from above using the thrusts produced by the fans provided to the front portion and the rear portion of the aircraft. As a result, the aircraft can fly with its attitude stably maintained.

When the attitude of the vertical takeoff and landing aircraft described above is controlled, the thrusts, which need to be produced by the respective fans, are set based on the inertia moments, which are design properties, applied to the aircraft. However, the inertia moments, which are applied around the predetermined rotational axes of the aircraft, may be changed due to changes in the volume and the position of the freight loaded on the aircraft, a change in the weight due to the changing of the operator, a change in the amount of remaining fuel, etc. As a result, the stability in the attitude control of the aircraft may be reduced.

SUMMARY OF THE INVENTION

An aspect of the invention relates to a vertical takeoff and landing aircraft that includes multiple thrust producing devices that produce thrusts applied in the substantially vertically upward direction; a target attitude setting portion that sets a target attitude used in attitude control of the aircraft; an inertia moment deriving portion that derives an inertia moment applied around a predetermined rotational axis of the aircraft; and a thrust adjustment portion that adjusts, during the attitude control of the aircraft, the thrusts to be produced by the respective thrust producing devices based on the target attitude set by the target attitude setting portion and the inertia moment during the attitude control, which is derived by the inertia moment deriving portion.

In the vertical takeoff and landing aircraft, the thrusts to be produced by the multiple thrust producing devices are constantly adjusted such that the attitude of the aircraft is adjusted to the target attitude. The magnitudes of thrusts are set based on the inertia moments, which are design properties, applied around the predetermined rotational axes of the aircraft. However, the inertia moments, which are applied around the predetermined rotational axes of the aircraft, may be changed due to changes in the volume and the position of the freight loaded on the aircraft, a change in the weight due to the changing of the operator, a change in the amount of remaining fuel, etc.

In such a case, if the thrusts to be produced by the respective thrust producing devices are adjusted base on the fixed inertia moments, it is sometimes difficult to stably adjust the attitude of the aircraft to the target attitude.

Therefore, according to the aspect of the invention, the inertia moments applied around the rotational axes of the aircraft are derived at appropriate time. In the attitude control of the aircraft, the values of the thrusts to be produced by the respective thrust producing devices are set based on the derived inertia moments.

Thus, even if the inertia moments applied around the rotational axes of the aircraft change due to changes in the weight distribution of the aircraft, the values of the thrusts to be produced by the respective thrust producing devices can be appropriately set based on the changed inertia moments. Accordingly, it is possible to more reliably adjust the attitude of the aircraft to the target attitude. As a result, the attitude control can be performed more stably.

BRIEF DESCRIPTION OF THE DRAWINGS

The foregoing and/or further objects, features and advantages of the invention will become more apparent from the following description of example embodiments with reference to the accompanying drawings, wherein the same or corresponding portions will be denoted by the same reference numerals and wherein.

DETAILED DESCRIPTION OF THE EXAMPLE EMBODIMENTS

Hereafter, the invention will be described in more detail in terms of example embodiments thereof.

Figure 1:
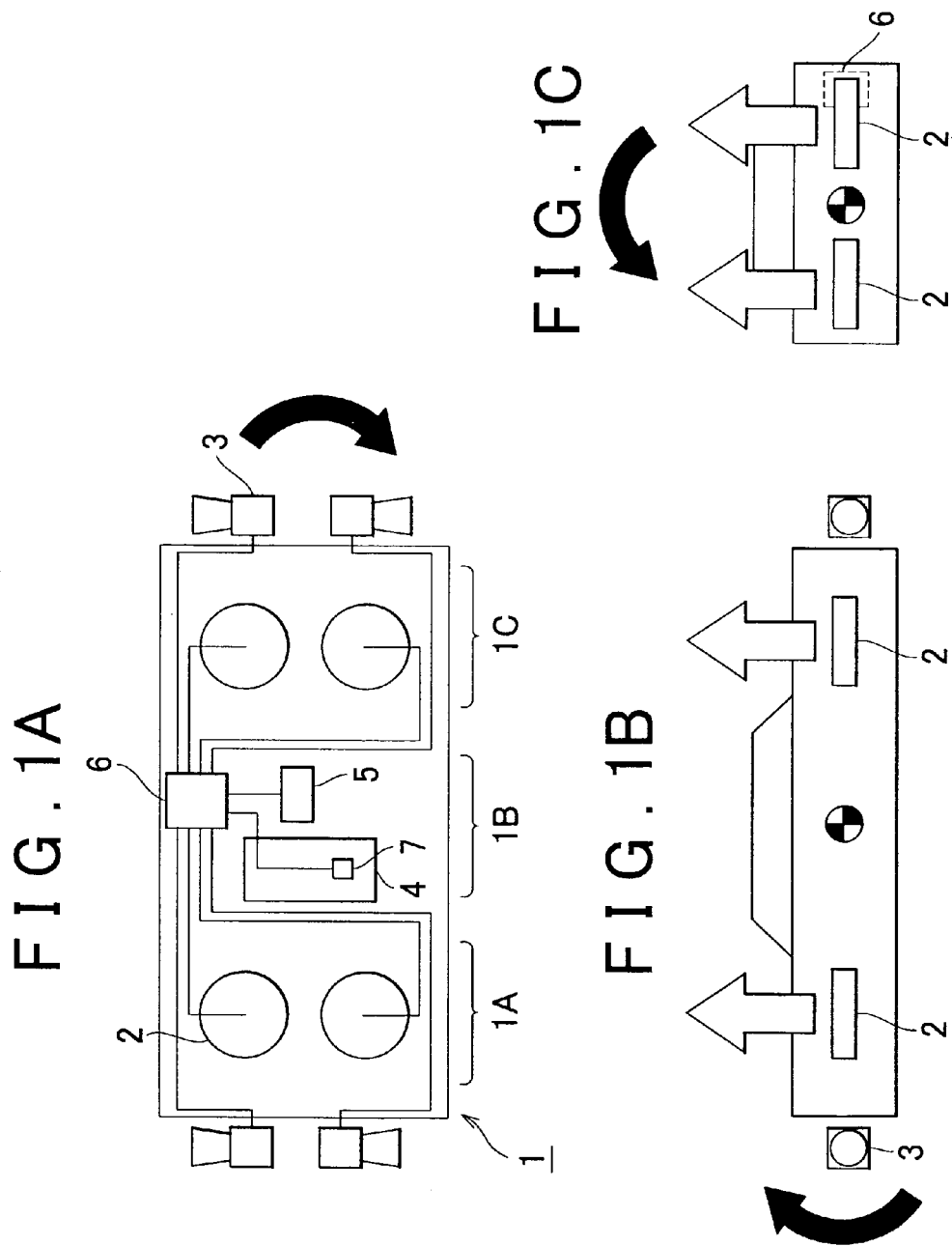
FIGS. 1A to 1C are the views schematically showing the structure of an aircraft according to a first embodiment of the invention.

FIGS. 1A to 1C show the appearance of a vertical takeoff and landing aircraft 1 (hereinafter, simply referred to as an "aircraft 1") according to a first embodiment of the invention. FIG. 1A illustrates the aircraft 1 viewed from above. FIGS.

1B and 1C are the side views of the aircraft 1 viewed in different two directions. In the description below, the left side of FIG. 1A corresponds to the front side of the aircraft 1; the right side of FIG. 1A corresponds to the rear side of the aircraft 1; the upper side of FIG. 1A corresponds to the right side of the aircraft 1; the lower side of FIG. 1A corresponds to the left side of the aircraft 1; the front side with respect to the sheet, on which FIG. 1A is drawn, corresponds to the upper side of the aircraft 1; and the rear side with respect to the sheet, on which FIG. 1A is drawn, corresponds to the lower side of the aircraft 1.

The aircraft 1 is formed from three blocks, that are, an aircraft front portion 1A, an aircraft middle portion 1B, and an aircraft rear portion 1C. The aircraft front portion 1A, the aircraft middle portion 1B, and the aircraft rear portion 1C are arranged in this order from the front side of the aircraft 1. Each of the aircraft front portion 1A and the aircraft rear portion 1C is provided with two fans 2 that serve as thrust producing devices. The two fans 2 are provided at positions that are bilaterally-symmetric with respect to the central axis of the aircraft 1. The fans 2 are firmly fixed to the aircraft 1.

A load space 4, where an operator of the aircraft 1 sits and freight is loaded, is reserved in the aircraft middle portion 1B. A weight sensor 7, which detects the weight of the freight loaded, is provided in the load space 4.

Various methods for driving the fans 2 may be employed. The fans 2 may be driven by, for example, high-pressure gas, electric power, or an output from a shaft of a motor. A drive source and the structure of a drive system that transmits driving force to the fans 2 vary depending on the employed method for driving the fans 2. In the first embodiment of the invention, the rotating shafts of the fans 2 are rotated by electric power. The fans 2 rotate at a high speed using the driving force supplied from a drive source (not shown) to generate airflows going in the downward direction of the aircraft 1, thereby producing thrusts applied to the aircraft 1 in the substantially vertically upward direction (in the direction of outline arrows in FIG. 1). The thrusts produced by the fans 2 enable the aircraft 1 to take off/land in the vertical direction.

Two gas injectors 3 are provided at the front end of the aircraft front portion 1A of the aircraft 1. In addition, other two gas injectors 3 are provided at the rear end of the aircraft rear portion 1C of the aircraft 1. The gas injectors 3 are used to turn the aircraft 1 in the lateral direction. The two gas injectors 3 provided at the front end of the aircraft 1 and the other two gas injectors 3 provided at the rear end of the aircraft 1 inject high-pressure gas in the opposite directions. Thus, a couple of forces is applied to the aircraft 1 in the lateral direction, whereby the aircraft 1 is turned in the lateral direction.

The aircraft middle portion 1B is provided with a CPU 6, which controls the rotational speeds of the respective fans 2, thus adjusting the magnitudes of thrusts produced by the respective fans 2. The CPU 6 adjusts the magnitudes of thrusts produced by the respective fans 2, thereby controlling the attitude of the aircraft 1. Further, the aircraft middle portion 1B is provided with a gyro 5 that detects the tilt angles of the aircraft 1 in the predetermined directions in order to control the attitude of the aircraft 1. The gyro 5 also serves as a position detection sensor that detects the position of the aircraft 1 in the lateral direction.

If the aircraft 1 is tilted during flight due to disturbances such as wind, the gyro 5 detects the tilt angles of the aircraft 1 in the predetermined directions, and the CPU 6 calculates the thrusts, which need to be produced by the respective fans 2 to correct the attitude of the tilted aircraft 1 to the horizontal attitude. Then, the rotational speeds of the respective fans 2 are controlled based on the thrusts calculated, whereby the thrusts are adjusted.

If the aircraft 1 is tilted, the thrust applied in the vertical direction decreases, which may decrease the altitude of the aircraft 1. Accordingly, adjustments of the thrusts for maintaining the altitude of the aircraft 1 are also made.

If the rotational speeds of the respective fans 2 are changed, a turning force may be applied to the aircraft 1 in the yaw direction due to the reaction forces of the turning forces of the respective fans 2. In such a case, the tilt angle of the aircraft 1 in the yaw direction is detected by the gyro 5, and the gas is injected from the gas injectors 3 to correct the attitude of the aircraft 1, which has been tilted in the yaw direction, to the horizontal attitude.

In this case, the inertia moments that are applied to the aircraft 1 in the pitch direction and the roll direction are important factors. On the assumption that the magnitude of thrust produced by each fan 2 is constant, if the inertia moments are small, attitude of the tilted aircraft 1 can be corrected to the horizontal attitude relatively quickly. On the other hand, if the inertia moments are great, it takes long to correct the attitude of the tilted aircraft 1 to the horizontal attitude.

In the first embodiment of the invention, the pitch direction signifies the direction indicated by the solid arrow in FIG. 1B, namely, the direction in which the aircraft 1 is tilted in its fore-and-aft direction. The roll direction signifies the direction indicated by the solid arrow in FIG. 1C, namely, the direction in which the aircraft 1 is tilted in its lateral direction. The yaw direction signifies the direction indicated by the solid arrow in FIG. 1A, namely, the direction in which the aircraft 1 rotates about the axis extending perpendicularly to the aircraft 1. The direction indicated by the arrow is the positive direction of each of the pitch direction, the roll direction, and the yaw direction.

According to the related art, when the thrusts, which need to be produced by the respective fans 2, are calculated, the inertia moments applied to the aircraft 1 in the pitch direction and the roll direction are derived in advance, as invariant values, based on the design values. Then, the thrusts, which are required to correct the attitude of the tilted aircraft 1 to the horizontal attitude, are calculated. After this, the values of the thrusts are corrected using the values of the above-mentioned inertial moments, whereby the thrusts, which will be actually produced by the respective fans 2, are finally calculated.

With this configuration, however, if the volume of freight loaded on the aircraft 1 is changed, the inertia moments applied to the aircraft 1 in the pitch direction and the roll direction change. This may prevent accurate calculation of the thrusts, which need to be actually produced by the respective fans 2. As a result, it is sometimes difficult to smoothly control the attitude of the aircraft 1.

In contrast to this, according to the first embodiment of the invention, the inertia moments applied to the aircraft 1 in the pitch direction and the roll direction are detected at appropriate time, and the thrusts, which need to be actually produced by the respective fans 2, are calculated using the values of the inertia moments detected when the attitude of the aircraft 1 is actually controlled.

Figure 2:
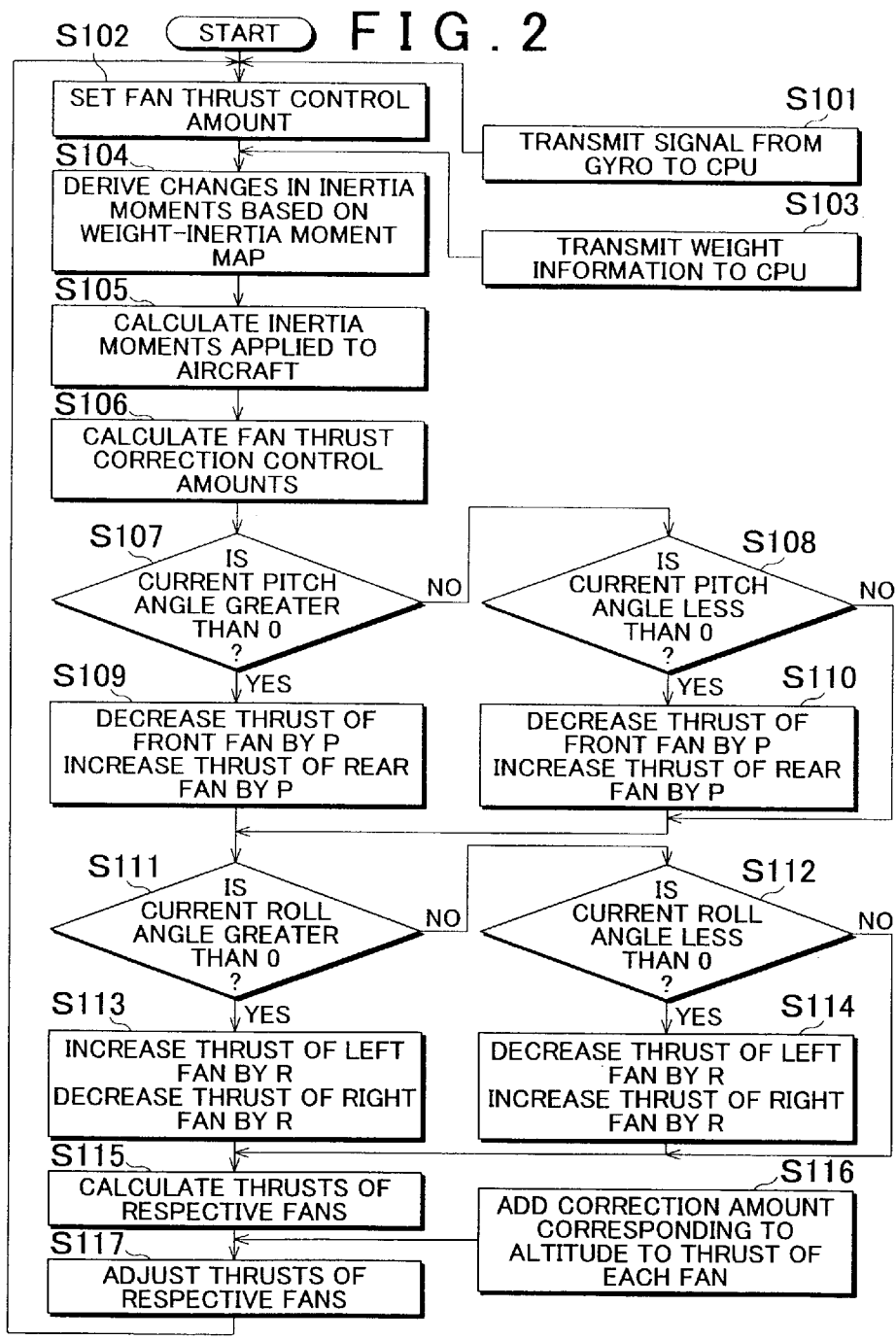
FIG. 2 is the flowchart showing the thrust adjustment routine according to the first embodiment of the invention.

FIG. 2 shows the thrust adjustment routine according to the first embodiment of the invention. The thrust adjustment routine is performed by the CPU 6 at predetermined time intervals while the aircraft 1 is operating. The thrust adjustment routine is performed to maintain the substantially horizontal attitude of the aircraft 1 even if a disturbance such as wind occurs.

When the thrust adjustment routine is started, first, a signal from the gyro 5 is transmitted to the CPU 6 in step S101. The gyro 5 forms an attitude detection portion according to the invention.

Next, in step S102, the fan thrust control amounts are set. The thrust, which needs to be produced by each fan 2, is set based on the basic thrust required for hovering and the fan thrust control amount that will be added to/subtracted from the basic thrust in order to control the attitude of the aircraft 1. Namely, the fan thrust control amount is the amount of thrust that needs to be added to/subtracted from the basic thrust. The fan thrust control amount that is used to control the attitude of the aircraft 1 in the pitch direction, and the fan thrust control amount that is used to control the attitude of the aircraft 1 in the roll direction are calculated.

Figure 3:
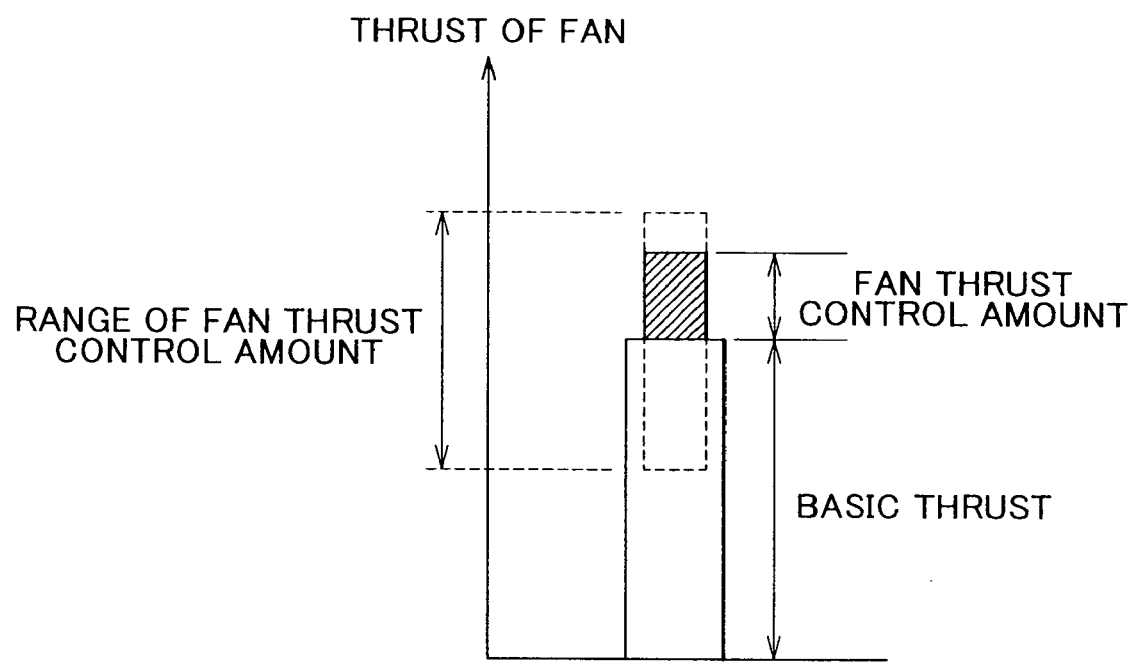
FIG. 3 is the graph showing the relationship between the basic thrust and the fan thrust control amount according to the first embodiment of the invention.

FIG. 3 is the graph showing the relationship between the basic thrust and the fan thrust control amount. The range of the fan thrust control amount extends from the value obtained by decreasing the basic thrust by approximately 30%, up to the value obtained by increasing the basic thrust by approximately 30%. In order to tilt the aircraft 1 in the negative direction of the pitch direction, the fan thrust control amount is subtracted from the basic thrust for each of the two fans 2 provided to the aircraft front portion 1A. Also, the fan thrust control amount is added to the basic thrust for each of the two fans 2 provided to the aircraft rear portion 1C.

Figure 4:
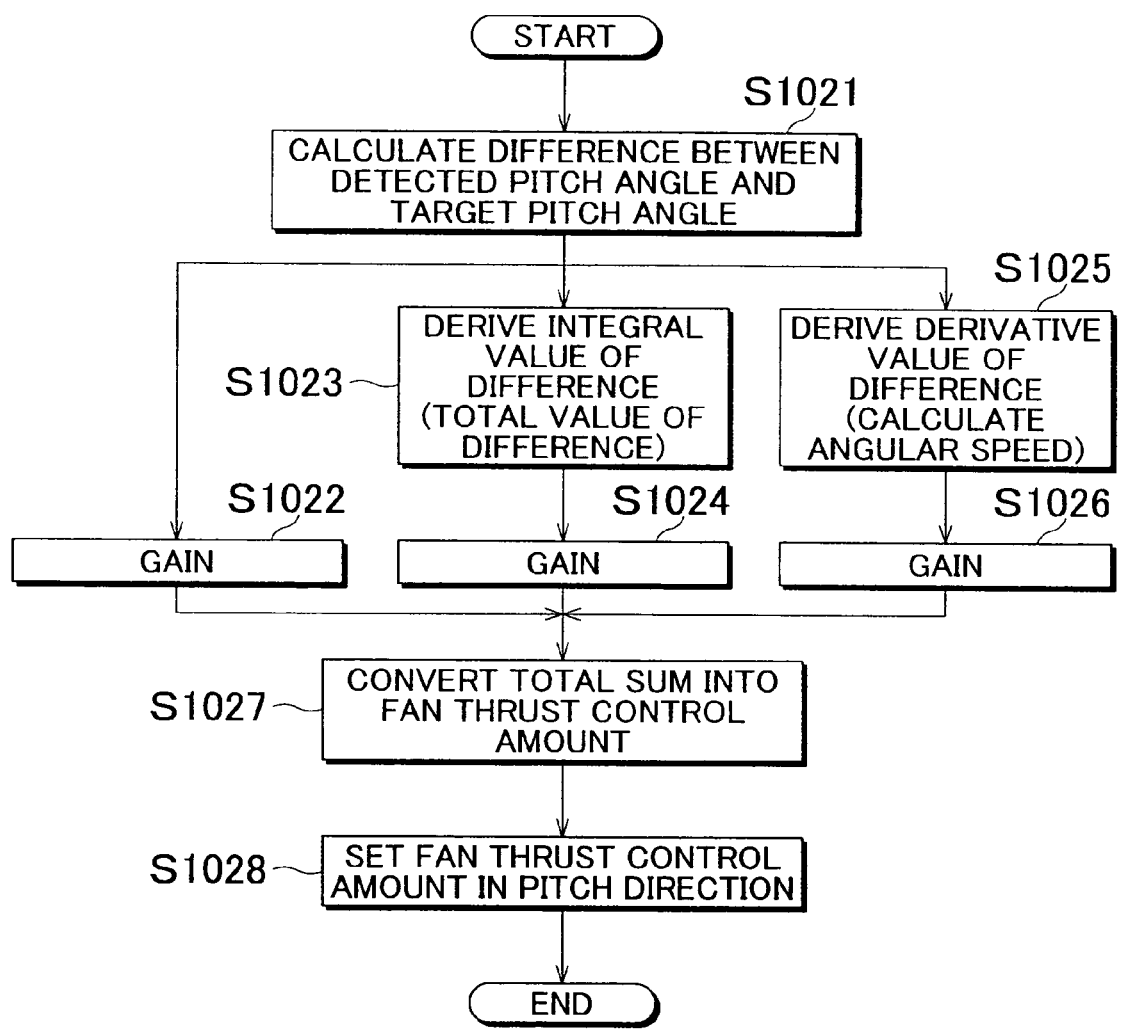
FIG. 4 is the flowchart showing the thrust control amount setting routine according to the first embodiment of the invention.

FIG. 4 shows the routine performed in step S102. FIG. 4 shows only the fan thrust control amount setting routine that is used to control the attitude of the aircraft 1 in the pitch direction. Meanwhile, the fan thrust control amount that is used to control the attitude of the aircraft 1 in the roll direction is also set in step S102 according to the routine similar to that shown in FIG. 4.

In step S1021 in FIG. 4, the difference between the tilt angle of the aircraft 1 in the pitch direction, which is detected in step S101, and the target pitch angle is calculated. The target pitch angle is an angle value that is set according to another routine. In the first embodiment of the invention, the target pitch angle is 0 degrees, because the horizontal attitude is the target attitude of the aircraft 1. The routine for setting the target pitch angle is also performed by the CPU 6. The CPU 6 forms a target attitude setting portion according to the invention.

Next, the total sum of the values, which are obtained by multiplying the difference calculated in step S1021, the integral value of the difference, and the derivative value of the difference by respective coefficients, is calculated by performing steps S1022 to S1026. In step S1027, the calculated total sum is converted into the value of the fan thrust control amount based on the map that defines the relationship between the calculated total sum and the fan thrust control amount. Finally, the fan thrust control amount, which is used to control the attitude of the aircraft 1 in the pitch direction, is set in step S1028. The relationship between the calculated total sum and the fan thrust control amount, which is defined in the map, may be a substantially directly proportional relationship.

FIG. 2 will be described again. In step S103 in FIG. 2, the weight information is transmitted from the weight sensor 7 to the CPU 6.

Figure 5:
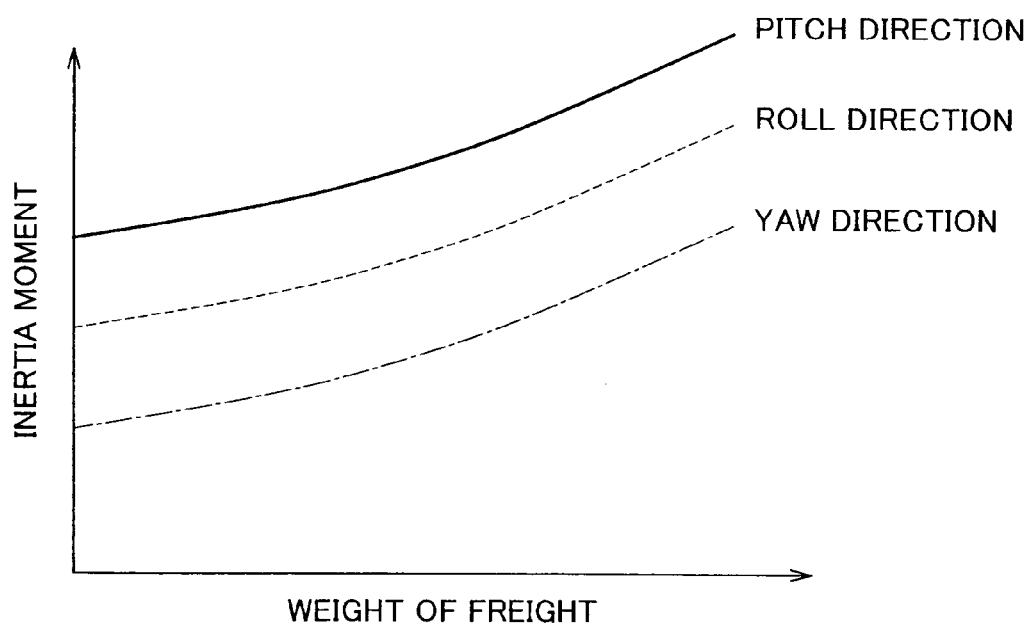
FIG. 5 is the graph showing the map that defines the relationship between the weight of freight and the inertia moments according to the first embodiment of the invention.

In step S104, the changes in the inertia moments, which are applied to the aircraft 1 in the pitch direction and the roll direction, due to a change in the weight of the freight loaded in the load space 4 are derived based on the weight-inertia moment map. The weight-inertia moment map defines the relationship, obtained in advance, between the weight of the freight loaded in the load space 4 and the inertia moments applied to the aircraft 1 in the pitch direction, the roll direction, and the yaw direction. FIG. 5 shows an example of the weight-inertia moment map.

In step S105, the inertia moments applied to the aircraft 1 in the pitch direction and the roll direction are calculated based on the changes in these inertia moments, which are derived in step S104.

Inertial moment applied to aircraft in pitch direction=inertial moment applied to aircraft in pitch direction before change in weight of freight+$fp$ (increase in weight of freight). (1)

Inertial moment applied to aircraft in roll direction=inertial moment applied to aircraft in roll direction before change in weight of freight+$fr$ (increase in weight of freight). (2)

In the above equations (1) and (2), the reference characters "fp" (increase in weight of freight) and "fr" (increase in weight of freight) denote the changes in the inertia moments, which are applied to the aircraft 1 in the pitch direction and the roll direction, respectively, derived based on the weight-inertia moment map shown in FIG. 5. The CPU 6, which performs step S105, forms an inertia moment deriving portion according to the invention.

Next, step S106 is performed. In step S106, the fan thrust correction control amounts, which are used to correct the attitude of the aircraft 1 in the pitch direction and the roll direction, are calculated as follows.

Correction control amount P used to correct attitude of aircraft 1 in pitch direction=fan thrust control amount used to correct attitude of aircraft 1 in pitch direction×[inertial moment applied to aircraft 1 in pitch direction×(pitch moment arm+roll moment arm)]/[(inertial moment applied to aircraft 1 in pitch direction+inertial moment applied to aircraft 1 in roll direction)×pitch moment arm]. (3)

Correction control amount R used to correct attitude of aircraft 1 in roll direction=fan thrust control amount used to correct attitude of aircraft 1 in roll direction×[inertial moment applied to aircraft 1 in roll direction×(pitch moment arm+roll moment arm)]/[(inertial moment applied to aircraft 1 in pitch direction+inertial moment applied to aircraft 1 in roll moment)×roll moment arm]. (4)

As the inertia moment increases, the thrust that needs to be produced by the fan 2 also increases. Also, as the moment arm from the gravity center of the aircraft 1 to the fan 2 is longer, the aircraft can rotate with less thrust. Accordingly, the fan thrust control amounts calculated in step S102 are corrected in order to more smoothly perform the attitude control using the current inertia moments calculated in step S105.

Next, step S107 is performed. In step S107, it is determined whether the current pitch angle of the aircraft 1 is greater than 0 degrees. If it is determined in step S107 that the current pitch angle of the aircraft 1 is greater than 0 degrees, step S109 is performed. On the other hand, if it is determined in step S107 that the current pitch angle of the aircraft 1 is equal to or less than 0 degrees, step S108 is performed.

In step S108, it is determined whether the current pitch angle of the aircraft 1 is less than 0 degrees. If it is determined in step S108 that the current pitch angle of the aircraft 1 is less than 0 degrees, step S110 is performed. On the other hand if it is determined in step S108 that the current pitch angle of the aircraft 1 is not less than 0 degrees, that is, the pitch angle is 0 degrees, it is determined that the attitude of the aircraft 1 need not be corrected in the pitch direction. Accordingly, step S111 is performed.

In step S109, it is decided that the thrust of the front fan 2 will be reduced by an amount P, and the thrust of the rear fan 2 will be increased by the amount P.

Similarly, in step S110, it is decided that the thrust of the front fan 2 will be increased by the amount P, and the thrust of the rear fan 2 will be decreased by the amount P.

Next, step S111 is performed. In step S111, it is determined whether the current roll angle of the aircraft 1 is greater than 0 degrees. If it is determined in step S111 that the current roll angle of the aircraft 1 is greater than 0 degrees, step S113 is performed. On the other hand, if it is determined in step S111 that the current roll angle of the aircraft 1 is equal to or less than 0 degrees, step S112 is performed.

In step S112, it is determined whether the current roll angle of the aircraft 1 is less than 0 degrees. If it is determined in step S112 that the current roll angle of the aircraft 1 is less than 0 degrees, step S114 is performed. On the other hand, if it is determined in step S112 that the current roll angle of the aircraft 1 is not less than 0 degrees, that is, the current roll angle is 0 degrees, it is determined that the attitude of the aircraft 1 need not be corrected in the roll direction. Accordingly, step S115 is performed.

In step S113, it is decided that the thrust of the left fan 2 will be increased by an amount R, and the thrust of the right fan 2 will be decreased by the amount R.

Similarly, in step S114, it is decided that the thrust of the left fan 2 will be decreased by the amount R, and the thrust of the right fan 2 will be increased by the amount R.

In step S115, the thrusts of the respective fans 2 are calculated. More specifically, the values of the thrusts to be produced by the front right fan 2, front left fan 2, rear right fan 2, and rear left fan 2 are calculated based on the determinations made in steps S109, S110, S113, and S114.

In step S116, the amount of correction, which needs to be made to the value of the thrust based on the altitude of the aircraft 1, is added to each of the calculated values of thrusts. When the aircraft 1 is tilted, the thrusts, which are produced by the fans 2 and which are applied to the aircraft 1 in the vertical direction, are reduced, which may decrease the altitude of the aircraft 1. According to the first embodiment of the invention, an altitude sensor (not shown) is provided to the aircraft 1. If the altitude of the aircraft 1 is unintentionally decreased, the correction amount corresponding to the output from the altitude sensor is calculated, and the correction amount is added to the value of the thrust to be produced by each fan 2.

Figure 6:
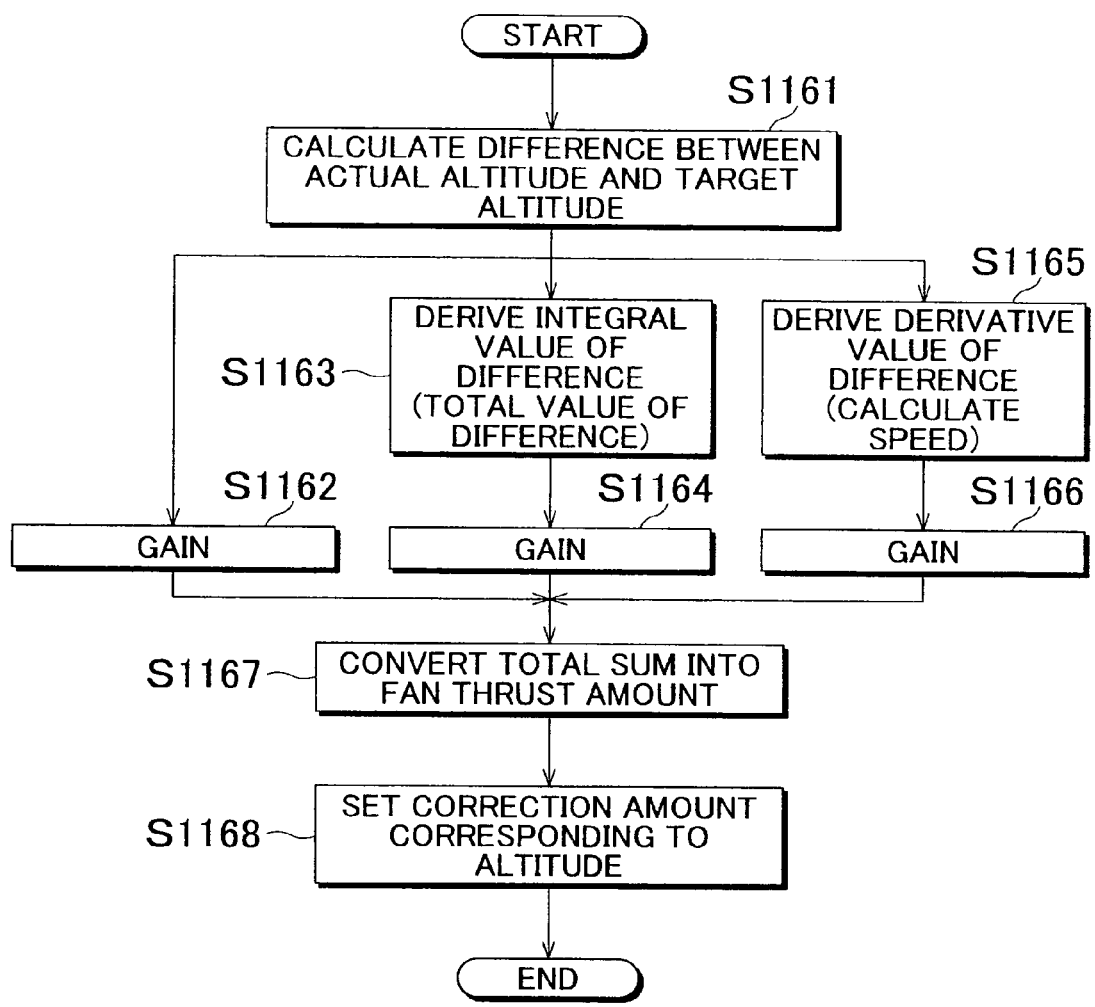
FIG. 6 is the flowchart showing the altitude correction amount setting routine according to the first embodiment of the invention.

FIG. 6 shows the routine performed in step S116. In step S1161 in FIG. 6, the difference between the altitude of the aircraft 1, which is obtained by the altitude sensor (not shown), and the target altitude is calculated.

Next, the total sum of the values, which are calculated by multiplying the difference calculated in step S1161, the integral value of the difference, and the derivative value of the difference by the respective coefficients, is calculated by performing steps S1162 to S1166. In step S1167, the calculated total sum is converted into the value of the fan thrust amount based on the map that defines the relationship between the calculated total sum and the fan thrust amount. Finally, the correction amount, which is derived based on the altitude, to be added to the value of the thrust produced by each fan is set in step S1168. The relationship between the total sum and the fan thrust amount, which is defined in the map used in step S1167, may be a substantially direct proportional relationship.

FIG. 2 will be described again. In step S117, the rotational speeds of the respective fans are adjusted in order to have the thrust producing devices of the aircraft 1 produce the thrusts calculated in the above-described manner. More specifically, the frequency of a signal output from an inverter (not shown), which outputs drive signals to the fans 2, is adjusted, whereby the rotational speeds of the respective fans 2 are adjusted. After step S117 ends, step S101 and the following steps are performed again. The CPU 6, which performs the above-described thrust adjustment routine, is included in a thrust adjustment portion according to the first embodiment of the invention.

Figure 7:
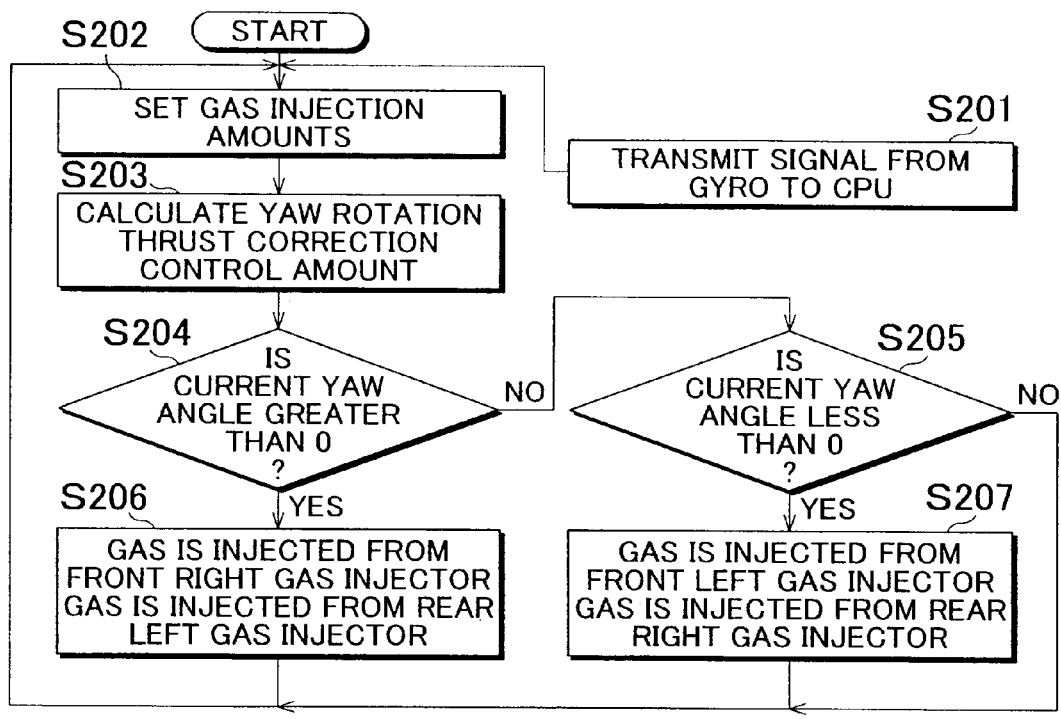
FIG. 7 is the flowchart showing the gas injection control routine according to the first embodiment of the invention.

As described above, when the rotational speeds of the respective fans 2 are changed, the turning force may be applied to the aircraft 1 in the yaw direction. Accordingly, while the thrust adjustment routine is performed, the gas injection control routine for controlling the attitude of the aircraft 1 in the yaw direction needs to be performed. FIG. 7 shows the gas injection control routine according to the first embodiment of the invention. Like the thrust adjustment routine, the gas injection control routine is performed at predetermined time intervals while the aircraft 1 is operating.

Like the thrust adjustment routine described above, first, an output is transmitted from the gyro 5 to the CPU 6 in step S201 in the gas injection control routine.

In step S202, the amounts of gas that can be injected from the respective gas injectors 3 are set. The gas injection amount setting routine is substantially the same as the fan thrust control amount setting routine shown in FIG. 4. Namely, first, the difference between the yaw angle of the aircraft 1 detected by the gyro 5 and the target yaw angle is calculated. Then, the total sum of the values, which are obtained by multiplying the difference, the integral value of the difference, and the derivative value of the difference by the respective coefficients, is calculated. The calculated total sum is converted into the gas injection amount based on the map, which is prepared in advance and which defines the relationship between the total sum and the gas injection amount. The amounts of gas that can be injected from the respective gas injectors 3 are the amounts of gas that needs to be injected to adjust the attitude of the aircraft 1 in the yaw direction to the target attitude the most quickly. If the gas, of which the amount is greater than the amount of gas that can be injected from each gas injector 3, is injected, it is difficult to stably correct the attitude of the aircraft 1 to the target attitude. The relationship between the total sum and the gas injection amount, which is defined in the map, may be a substantially direct proportional relationship.

In step S203, the yaw rotation thrust correction control amount is calculated. The yaw rotation thrust correction control amount is the smaller value selected from among the amount of gas that can be injected, which is calculated above, and the amount of gas that needs to be injected to achieve the desirable angular acceleration when the aircraft 1 is rotated in the yaw direction. For example, in the case where the target angular acceleration, which is used when the attitude of the aircraft 1 in the yaw direction is corrected is A degrees/sec$^2$, the target yaw torque and the target yaw thrust are calculated as follows.

Target yaw torque=inertial moment applied to aircraft 1 in the yaw direction×$A$×π/180. (5)

Target yaw thrust=target yaw torque/(moment arm from gravity center to gas injector/2). (6)

The target gas injection amount is set by calculating the gas injection amount corresponding to the target yaw thrust calculated according to the equation (6) based on the map that defines the relationship between the gas injection amount and the thrust applied in the yaw direction. The yaw rotation thrust correction control amount is the smaller value from among the calculated target gas injection amount and the amount of gas that can be injected from the gas injector 3, which is calculated in step S202.

Next, step S204 is performed. In step S204, it is determined whether the current yaw angle of the aircraft 1 is greater than 0 degrees. If it is determined in step S204 that the current yaw angle of the aircraft 1 is greater than 0 degrees, step S206 is performed. On the other hand, if it is determined in step S204 that the yaw angle of the aircraft 1 is equal to or less than 0 degrees, step S205 is performed. The target yaw angle of the aircraft 1 is 0 degrees.

In step S205, it is determined whether the current yaw angle of the aircraft 1 is less than 0 degrees. If it is determined in step S205 that the current yaw angle of the aircraft 1 is less than 0 degrees, step S207 is performed. On the other hand, if it is determined in step S205 that the current yaw angle of the aircraft 1 is not less than 0 degrees, that is, the current yaw angle of the aircraft 1 is 0 degrees, it is determined that the attitude of the aircraft 1 need not be corrected in the yaw direction. Accordingly, step S201 and the following steps are performed again.

In step S206, the gas, of which the amount corresponds to the yaw rotation thrust correction control amount calculated in step S203, is injected from each of the front right gas injector 3 and the rear left gas injector 3. Thus, the attitude of the aircraft 1 approaches the target attitude.

Similarly, in step S207, the gas, of which the amount corresponds to the yaw rotation thrust correction control amount calculated in step S203, is injected from each of the front left gas injector 3 and the rear right gas injector 3. Thus, the attitude of the aircraft 1 approaches the target attitude.

When step S206 or step S207 ends, the gas injection control routine is performed again.

According to the first embodiment described so far, when the aircraft 1 is tilted due to disturbances such as wind, the thrusts of the respective fans 2 are adjusted to correct the attitude of the aircraft to the horizontal attitude. At this time, the inertia moments applied to the aircraft 1 in the pitch direction and the roll direction are derived, in real time, based on the weight information from the weight sensor 7 provided in the load space 4. Then, the thrusts, which need to be produced by the respective fans 2, are calculated using the values of the inertia moments.

Accordingly, the optimum thrusts can be calculated based on a change in the amount of freight loaded on the aircraft 1, whereby the horizontal attitude of the aircraft 1 can be more stably maintained.

In the first embodiment of the invention, only the weight of the freight is detected by the weight sensor 7. Alternatively, the weight of the operator and the weight of the remaining fuel may also be detected by the weight sensor 7, and changes in these weights may be reflected on derivation of the inertia moments. Thus, the change in the inertia moments can be more accurately reflected on adjustment of the thrusts of the fans 2. A change in the position of the freight may be detected by using multiple weight sensors in combination.

In the first embodiment of the invention, the fans 2 are driven by electric power. Alternatively, the fans 2 may be driven by, for example, high-pressure gas. In this case, the rotational speeds of the respective fans 2 are adjusted, in step S117, by adjusting the opening amounts of compressed air valves.

In the gas injection control routine described above, an invariant value is used as the inertia moment applied to aircraft 1 in the yaw direction in the equation (5). Alternatively, the weight information may be detected each time the gas injection control routine is performed and the inertia moment applied to aircraft 1 in the yaw direction may be calculated each time the weight information is detected, as in the thrust adjustment routine.

Next, a second embodiment of the invention will be described in detail. According to the second embodiment of the invention, if the aircraft 1 is tilted due to wind or changes in the weight distribution of the aircraft 1 and position of the aircraft 1 in the lateral direction deviates from the target position, the attitude of the aircraft 1 is adjusted to the optimum target attitude, whereby the position of the aircraft 1 in the lateral direction is corrected to the target position. Because the aircraft 1 according to the second embodiment of the invention is the same as that shown in FIG. 1, the description concerning the aircraft 1 will not be given below.

Figure 8:
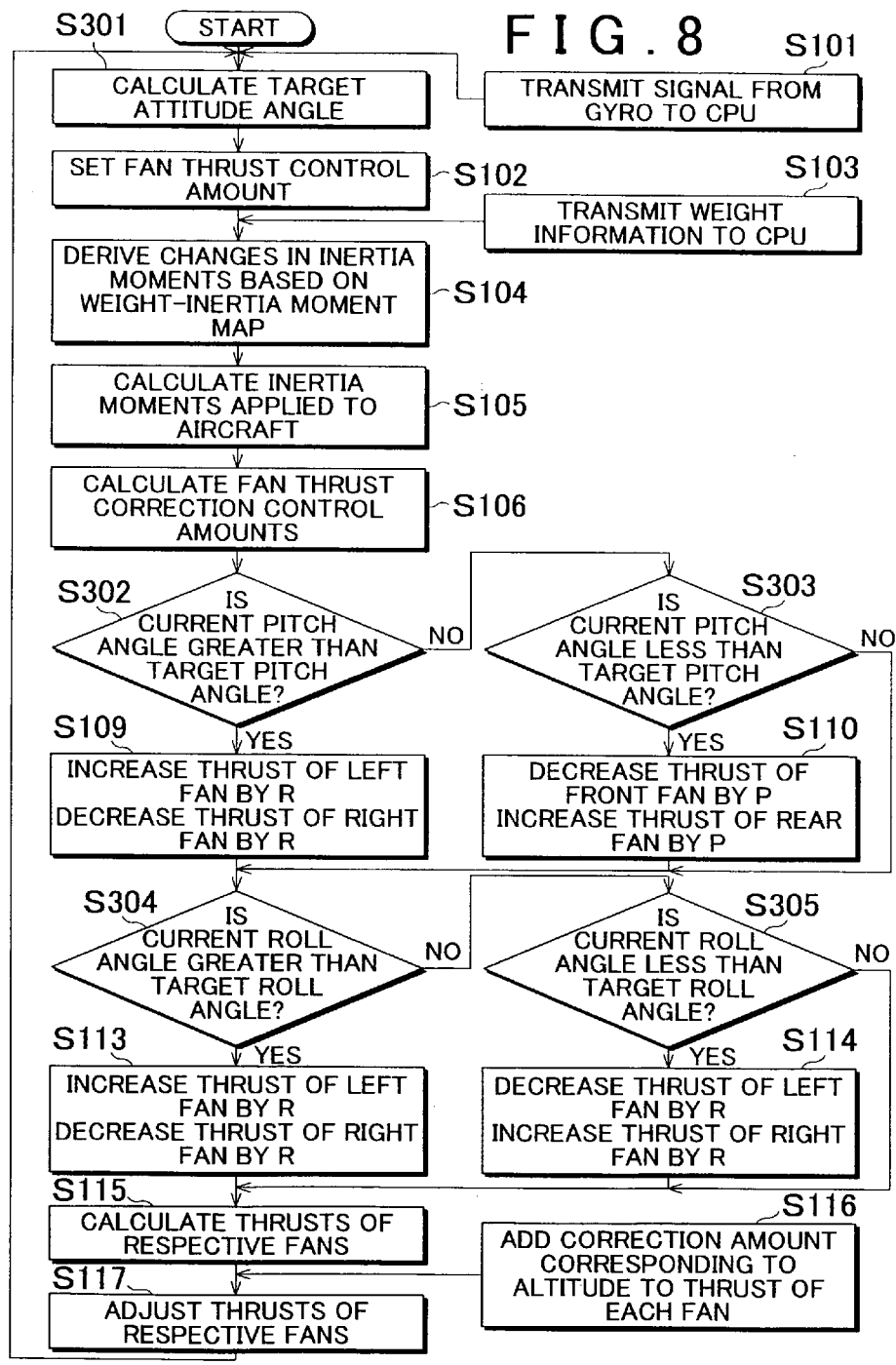
FIG. 8 is the flowchart showing the thrust adjustment routine according to a second embodiment of the invention.

FIG. 8 shows the thrust adjustment routine according to the second embodiment of the invention. The thrust adjustment routine according to the second embodiment is different from the thrust adjustment routine according to the first embodiment, which is shown in FIG. 2, mainly in that step S301 is performed in the thrust adjustment routine according to the second embodiment. In the thrust adjustment routine shown in FIG. 2, the target attitude angle of the aircraft 1 is 0 degrees, namely, the target attitude of the aircraft 1 is the horizontal attitude. However, in step S301, the attitude angle that is required to maintain the position of the aircraft 1 in the lateral direction at the target position is calculated, and is set as the target attitude angle.

Figure 9:
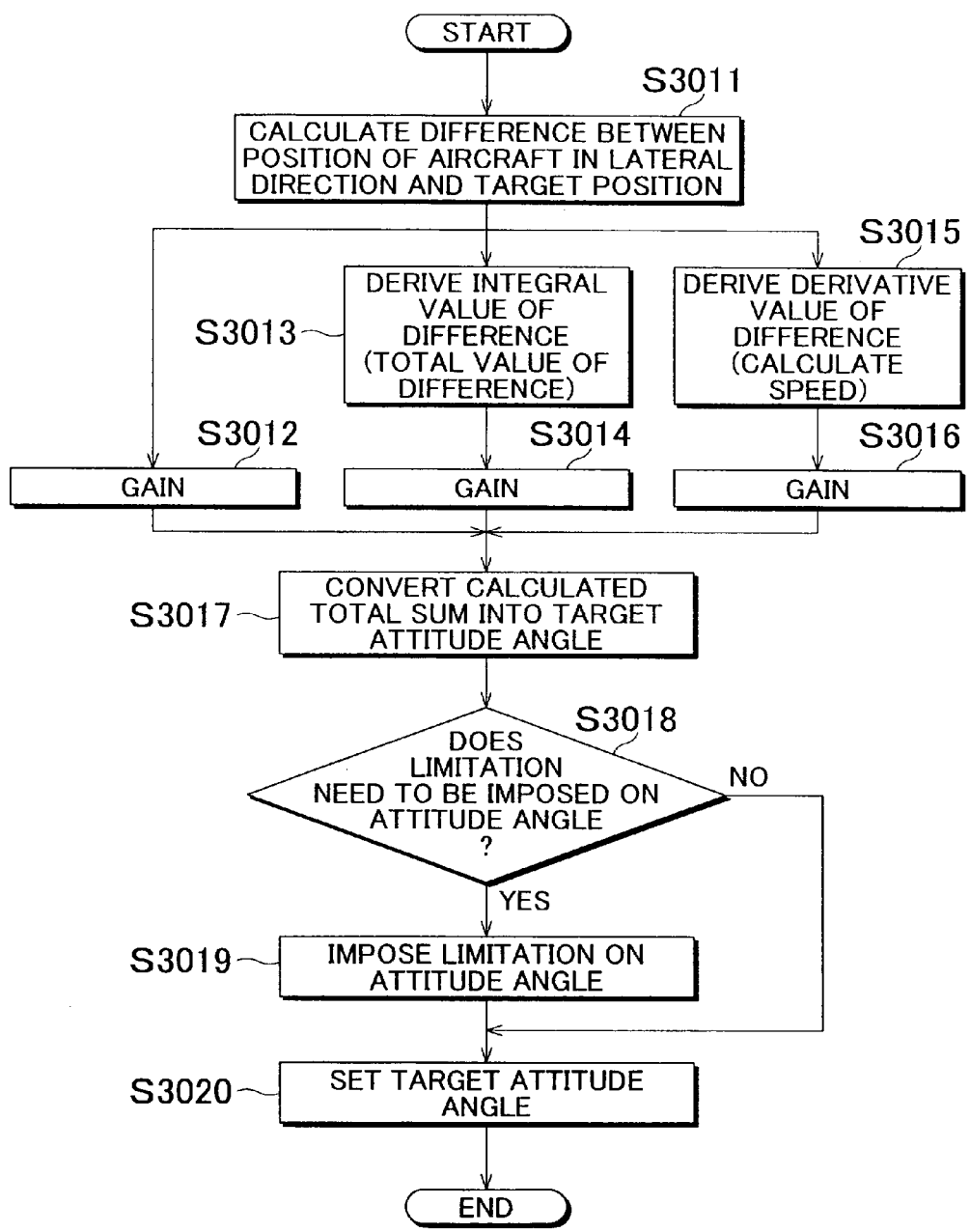
FIG. 9 is the flowchart showing the target attitude angle setting routine according to the second embodiment of the invention.

Hereafter, step S301 will be described in detail. FIG. 9 shows the routine performed in step S301. In the routine, first, the difference between the position of the aircraft 1 in the lateral direction and the target position is calculated in step S3011. The data concerning the position of the aircraft 1 in the lateral direction is transmitted from the position detection sensor of the gyro 5 to the CPU 6. The target position may be input by the operator. Alternatively, the target position may be obtained by reading the value set in the program in advance. The gyro 5 forms a position detection portion according to the invention. The CPU 6 stores the target position input by the operator or performs the program that defines the target position. The CPU 6 forms a target position setting portion according to the invention.

The total sum of the values, which are obtained by multiplying the deviation (the difference) of the actual position of the aircraft 1, which is obtained based on the output from the gyro 5, from the target position, the total value of the positional deviation (the integral value of the difference), and the speed of the positional deviation (the derivative value of the difference) by the respective coefficients, is calculated by performing steps S3012 to S3016.

In step S3017, the calculated total sum is converted into the target attitude angle of the aircraft 1 based on the map that defines the relationship between the calculated total sum and the target attitude angle of the aircraft 1. The relationship between the calculated total sum and the target attitude angle, which is defined in the map, may be a substantially direct proportional relationship.

In step S3018, it is determined whether limitation needs to be imposed on the target attitude angle obtained in step S3017. If the target attitude angle obtained in step S3018 is excessively great, problems may occur, for example, the aircraft 1 cannot continue flying stably.

If it is determined in step S3018 that limitation needs to be imposed on the target attitude angle of the aircraft 1, step S3019 is performed. On the other hand, if it is determined in step S3018 that limitation need not be imposed on the target attitude angle of the aircraft 1, step S3020 is performed.

In step S3019, limitation is imposed on the target attitude angle. More specifically, the target attitude angle obtained in step S3017 is converted into a limit value at which stable operation of the aircraft 1 can be maintained.

In step S3020, the target attitude angle obtained in step S3017 or the limit value obtained by imposing limitation on the target attitude angle in step S3019 is set as the final target attitude angle. Then, the routine ends. The CPU 6, which performs step S301, forms the target attitude setting portion according to the invention.

FIG. 8 will be described again. In the thrust adjustment routine described in FIG. 2, it is determined in step S107 whether the current pitch angle of the aircraft 1 is greater than 0 degrees, it is determined in step S108 whether the current pitch angle of the aircraft is less than 0 degrees, it is determined in step S111 whether the current roll angle of the aircraft 1 is greater than 0 degrees, and it is determined in step S112 whether the current roll angle of the aircraft 1 is less than 0 degrees. However, in the thrust adjustment routine according to the second embodiment of the invention, it is determined in step S302 whether the current pitch angle of the aircraft 1 is greater than the target pitch angle, it is determined in step S303 whether the current pitch angle of the aircraft is less than the target pitch angle, it is determined in step S304 whether the current roll angle of the aircraft 1 is greater than the target roll angle, and it is determined in step S305 whether the current roll angle of the aircraft 1 is less than the target roll angle.

As described so far, according to the second embodiment of the invention, the target attitude angle of the aircraft 1 is the angle that is required to correct the position of the aircraft 1 in the lateral direction to the target position. Accordingly, the position of the aircraft 1 in the lateral direction is maintained at the target position even if a disturbance such as wind occurs or even if the weight distribution of the aircraft changes.

At this time, the target attitude angle is calculated based on the deviation of the actual position of the aircraft 1 in the lateral direction from the target position and the derivative value and the integral value of the positional deviation. Accordingly, the deviation of the actual position of the aircraft 1 in the lateral direction from the target position can be minimized. Also, the actual position of the aircraft 1 in the lateral direction can be corrected to the target position more quickly.

Figure 10A:
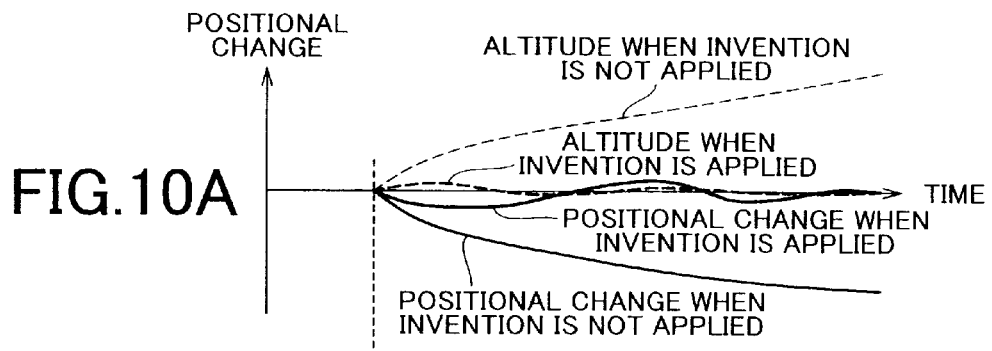
FIGS. 10A to 10C are the graphs showing the effects obtained by performing the thrust adjustment routine according to the second embodiment of the invention.
Figure 10B:
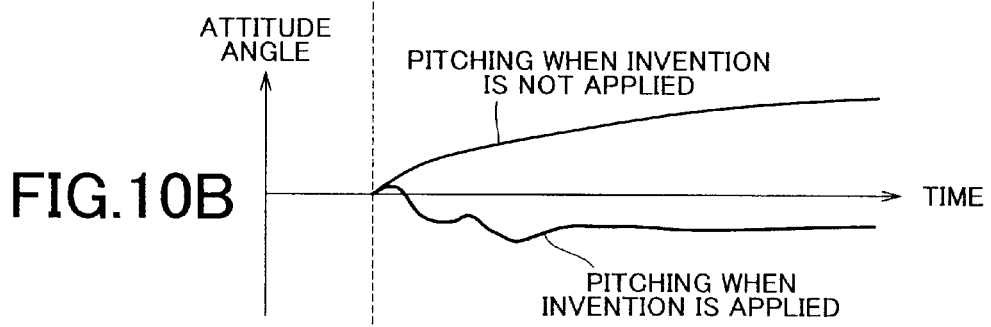
Figure 10C:
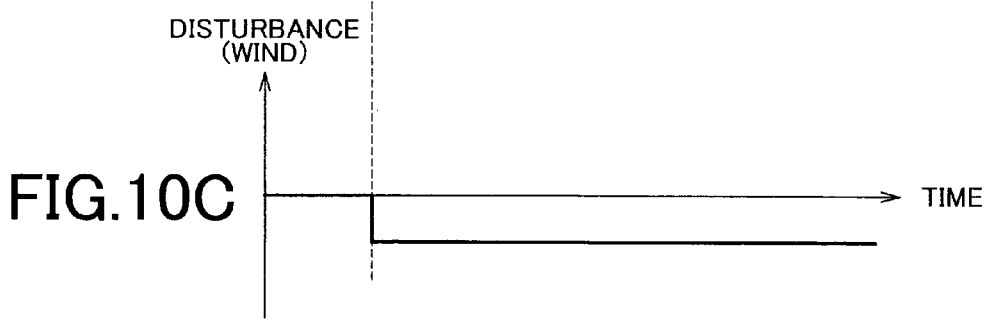

FIG. 10 shows changes in the attitude of the aircraft 1 and the position of the aircraft 1 in the lateral direction due to wind, in the case where the thrust adjustment routine according to the second embodiment is performed. As shown in FIG. 10, according to the second embodiment of the invention, even if a disturbance such as wind occurs, the position of the aircraft 1 in the lateral direction and the attitude angle of the aircraft 1 can be stably maintained at values close to the target values.

According to the second embodiment of the invention, the data concerning the position of the aircraft 1 in the lateral direction is detected by the position detection sensor of the gyro 5. However, such data may be detected by a sensor using the GPS (global positioning system).

Figure 11C:
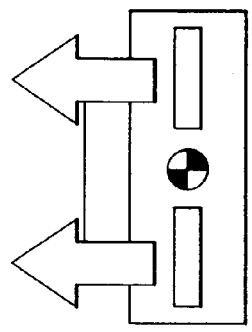
FIGS. 11A to 11C are the views schematically showing the structure of an aircraft according to a third embodiment of the invention.
Figure 11A:
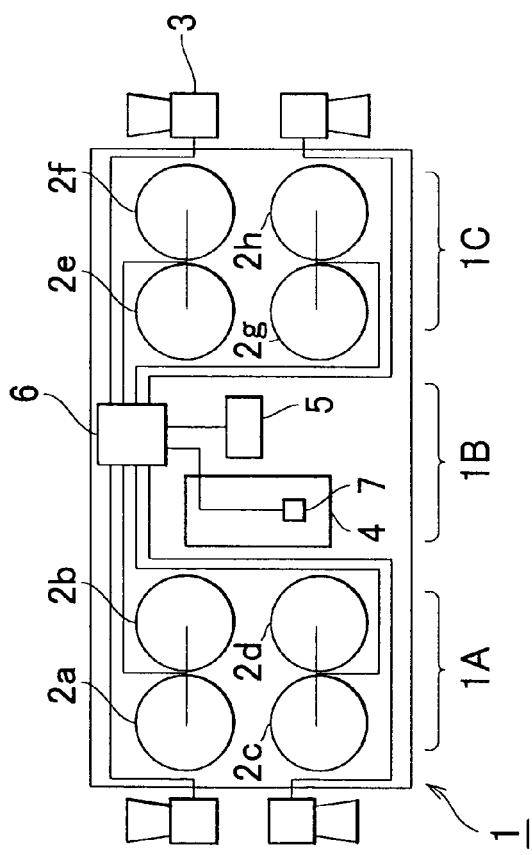
Figure 11B:
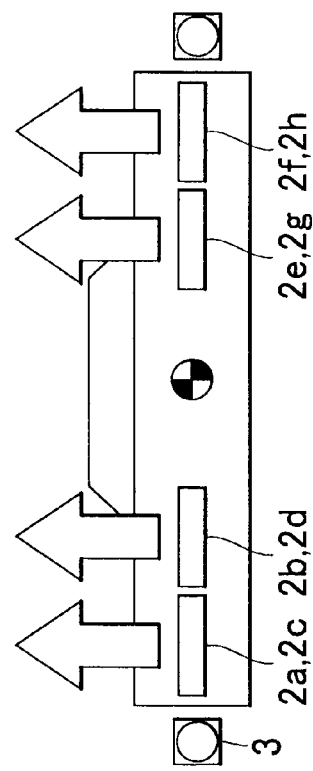

Next, a third embodiment of the invention will be described. In the third embodiment of the invention, the control method, which is employed when the number of the fans 2 serving as the thrust producing devices of the aircraft 1 is increased, will be described. FIG. 11 schematically shows the structure of the aircraft 1 according to the third embodiment of the invention. In the aircraft 1 according to the third embodiment of the invention, four fans 2 serving as the thrust producing devices are provided to each of the aircraft front portion 1A and the aircraft rear portion 1C. Namely, the aircraft 1 is provided with eight fans 2.

According to the third embodiment of the invention, when the thrusts are adjusted by controlling the rotational speeds of the respective fans 2, two adjacent fans 2 are grouped in a pair, whereby four pairs of fans 2 (2a and 2b, 2c and 2d, 2e and 2f, and 2g and 2h) are formed. The same control is performed on the two fans 2 in the same pair. Each pair corresponds to a thrust producing device group according to the invention.

According to the third embodiment of the invention, the thrusts of the respective fans 2 are controlled according to substantially the same routine as the thrust adjustment routine shown in FIG. 2. The pitch moment arm and the roll moment arm in the equations (3) and (4) are the lengths of the lines connecting the gravity center of the aircraft 1 to the midpoint between the rotational centers of the two fans in each pair in the pitch direction and the roll direction, respectively.

In the third embodiment of the invention, control is performed on the assumption that each pair corresponds to one fan. More specifically, the midpoint between the rotation centers of the two fans in each pair is regarded as the rotational center of one fan formed of one pair. The total thrust produced by two fans in each pair is regarded as the thrust produced by one fan formed of the pair. The same control as that when the aircraft 1 is provided with four fans is performed.

Thus, even if the number of fans increases, the thrusts can be adjusted in the same control method as that when only four fans are provided. As a result, the control can be simplified, and the cost can be reduced.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less, or only a single element, are also within the spirit and scope of the invention.

The invention claimed is:

1. A vertical takeoff and landing aircraft, comprising:

multiple thrust producing devices that produce thrusts applied in a substantially vertically upward direction; and a central processing unit, wherein the central processing unit is programmed to perform:

a target attitude setting routine that sets a target attitude used in attitude control of the aircraft;

an inertial moment deriving routine that derives, in real time during the attitude control of the aircraft, an inertia moment with respect to a predetermined rotational axis of the aircraft; and a thrust adjustment routine that adjusts, during the attitude control of the aircraft, the thrusts to be produced by the respective thrust producing devices based on the target attitude set by the target attitude setting routine and the inertia moment during the attitude control, which is derived by the inertial moment deriving routine.

2. The vertical takeoff and landing aircraft according to claim 1, further comprising:

a gyroscope that detects aircraft Position in a lateral direction;

and wherein the central procession unit is further programmed to perform:

a target position setting routine that changes a position of the aircraft in a lateral direction by controlling the attitude of the aircraft, and that sets a target position of the aircraft in the lateral direction; and a target attitude setting routine that sets the target attitude of the aircraft based on a difference between the target position set by the target position setting routine and the position of the aircraft in the lateral direction, which is detected by the gyroscope.

3. The vertical take off and landing aircraft according to claim 1, further comprising:

a gyroscope that detects attitude of the aircraft, wherein the thrust adjustment routine adjusts the thrusts to be produced by the respective thrust producing devices based on a difference between the target attitude and the attitude of the aircraft detected by the gyroscope, and the inertial moment during the attitude control, which is derived by the inertia moment deriving routine.

4. The vertical takeoff and landing aircraft according to claim 3, wherein:

the central processing unit is further programmed to perform:

a target position setting routine that changes a position of the aircraft in a lateral direction by controlling the attitude of the aircraft, and that sets a target position of the aircraft in the lateral direction; and the target attitude setting routine sets the target attitude of the aircraft based on a difference between the target position set by the target position setting routine and the position of the aircraft in the lateral direction, which is detected by the gyroscope.

5. The vertical takeoff and landing aircraft according to claim 3, wherein the thrust adjustment routine adjusts the thrusts to be produced by the respective thrust producing devices based also on a derivative value of the difference and an integral value of the difference.

6. The vertical takeoff and landing aircraft according to claim 1, wherein the multiple thrust producing devices are grouped into at least two thrust producing device groups, and the thrust adjustment routine makes a same adjustment to the thrusts to be produced by the thrust producing devices in the same thrust producing device group.

* * * * *

UNITED STATES PATENT AND TRADEMARK OFFICE
CERTIFICATE OF CORRECTION

PATENT NO. : 7,568,655 B2
APPLICATION NO. : 11/504717
DATED : August 4, 2009
INVENTOR(S) : Masatsugu Ishiba It is certified that error appears in the above-identified patent and that said Letters Patent is hereby corrected as shown below:

In claim 2, column 12, line 64, "Position" should read --position--;

In claim 2, column 12, line 66, "procession" should read --processing--;

In claim 3, column 13, line 10, "take off" should read --takeoff--.

Signed and Sealed this

Twenty-ninth Day of September, 2009

David J. Kappos
*Director of the United States Patent and Trademark Office*